No. 667,006. Patented Jan. 29, 1901.
J. DAVIS.
FILTER.
(Application filed Oct. 10, 1900.)
(No Model.)

Witnesses
F. L. Ourand
N. Parker Reinohl

Inventor
John Davis
By D. C. Reinohl
Attorney

THE NORRIS PETERS CO., PHOTO-LITHO., WASHINGTON, D. C.

UNITED STATES PATENT OFFICE.

JOHN DAVIS, OF PITTSBURG, PENNSYLVANIA.

FILTER.

SPECIFICATION forming part of Letters Patent No. 667,006, dated January 29, 1901.

Application filed October 10, 1900. Serial No. 32,661. (No model.)

*To all whom it may concern:*

Be it known that I, JOHN DAVIS, a citizen of the United States, residing at Pittsburg, in the county of Allegheny and State of Pennsylvania, have invented certain new and useful Improvements in Filters; and I do hereby declare the following to be a full, clear, and exact description of the invention, such as will enable others skilled in the art to it which appertains to make and use the same.

My invention relates to filters, has especial reference to that class in which a granular bed is used for arresting the impurities contained in the water, and consists in certain improvements in construction, which will be fully disclosed in the following specification and claims.

Figure 1:
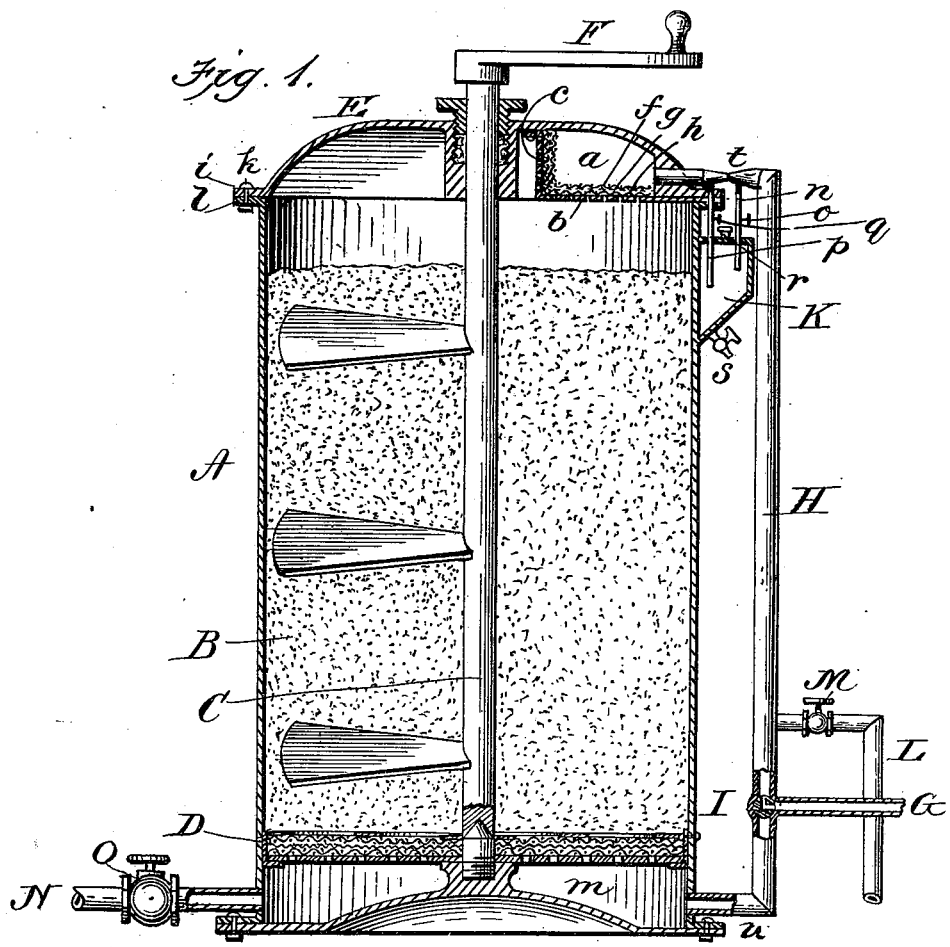
Figure 2:
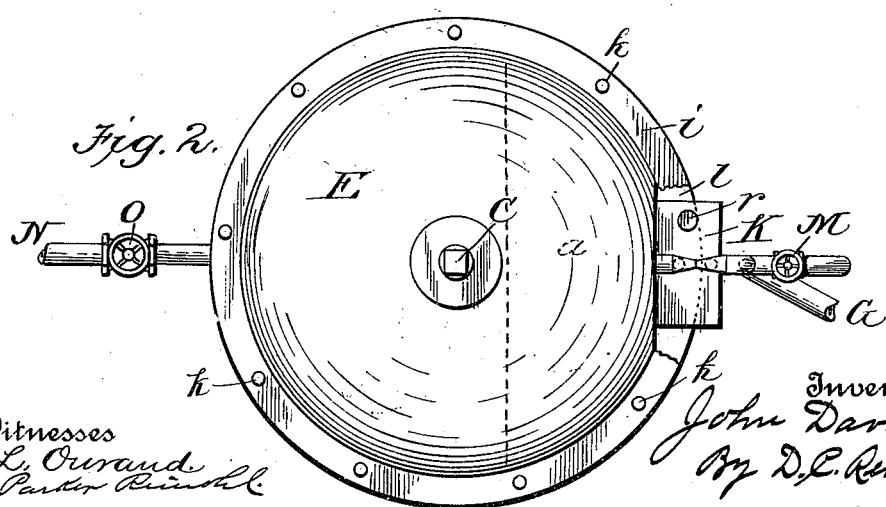

In the accompanying drawings, which form part of this specification, Figure 1 represents a vertical transverse section, partly in side elevation; and Fig. 2, a top plan view with part of the cover broken away.

Reference being had to the drawings and letters thereon, A indicates the body of the filter; B, the granular bed; C, the agitator; D, the filter-bottom; E, the cover or top of the filter, through which the shaft of the agitator extends and is provided with a crank F. In the cover or top is a receiving-chamber $a$, which crosses the cover and is provided with a foraminous or perforated bottom wall $b$ and an end wall $c$, over which are stretched layers $f$, $g$, and $h$ of wire-cloth and suitably secured in position by solder or otherwise. The layers $f$ and $h$ are of coarse mesh and the intermediate layer $g$ of fine mesh to prevent wasting of the granular bed when the bed is being cleaned, and the walls $b$ and $c$ are detachably secured to the cover E by the bottom $b$ extending out under the flange $i$ of the cover and secured by bolts $k$ extending through the flange $i$, the bottom $b$, and the flange $l$ on the body of the filter. The walls of the receiving-chamber and the wire covering may thus be readily removed and renewed at very small expense and any deleterious deposits on the covering or the walls removed.

G indicates the supply-pipe, which communicates with the distributing-pipe H by means of a three-way valve I to direct the water into the receiving-chamber $a$ to be filtered or into the chamber $m$ below the filter-bed for the purpose of cleaning the filter-bed. The pipe H enters the chamber $a$ and communicates with a receptacle K on the side of the body of the filter by means of pipes $n$, having a valve $o$, and pipe $p$, having valve $q$ for supplying a suitable chemical, such as alum, to the water for the purpose of coagulating the impurities in the water. The receptacle K is provided with a nozzle $r$ for supplying the chemical and with a cock $s$ for drawing off the sediment which collects in the receptacle, and the receptacle may be made of any lateral width desired to receive the charge of the chemical required without increasing the transverse dimension thereof, and thereby necessitating the lateral extension of the upper and lower branches $t$ and $u$ of the pipe H and moving said pipe farther from the body of the filter.

L is a waste-pipe connected to the pipe H above the three-way valve I and is provided with a valve M for conducting the dirty water from the filter when washing the bed, and N is a pipe provided with a valve O for discharging filtered water from the chamber $m$.

Having thus fully described my invention, what I claim is—

1. A filter having a water-receiving chamber in its cover, the inner end wall and the bottom of which chamber are separate from the cover and the latter supported and secured between the flanges of the body and the cover, and a multiple covering of wire-cloth of different mesh secured to said end wall and bottom.

2. A filter having a water-receiving chamber in its cover, a chemical-receptacle outside and near the upper end of the filter, and a filtered-water chamber in the lower end of the filter; in combination with a supply-pipe, a distributing-pipe communicating with said chemical-receptacle by a branch crossing the receptacle, and connections therewith, and a waste-pipe communicating with said distributing-pipe.

3. A filter having a water-receiving chamber in its cover provided with a perforated wall and a cover of wire-gauze, a chemical-receptacle near the upper end and outside the filter, and a filtered-water chamber in the lower end of the filter; in combination with a supply-pipe, a distributing-pipe communicating with said chemical-receptacle by a branch crossing the receptacle, and communicating with the receiving-chamber and the filtered-water chamber.

In testimony whereof I affix my signature in presence of two witnesses.

JOHN DAVIS.

Witnesses:
WM. W. WISHART,
ALEXANDER WISHART.